(12) United States Patent
Pfab

(10) Patent No.: US 6,195,752 B1
(45) Date of Patent: Feb. 27, 2001

(54) ELECTRONIC DATA PROCESSING CIRCUIT

(75) Inventor: Stefan Pfab, Grosshesselohe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/292,268

(22) Filed: Apr. 15, 1999

Related U.S. Application Data

(63) Continuation of application No. PCT/DE97/02070, filed on Sep. 15, 1997.

(30) Foreign Application Priority Data

Oct. 15, 1996 (DE) ............................................... 196 42 560

(51) Int. Cl.$^7$ ...................................................... G06F 1/12
(52) U.S. Cl. .................... 713/168; 713/190; 713/193; 713/201; 380/255; 380/37; 380/42
(58) Field of Search ................................ 380/255, 37, 42; 713/168, 190, 193, 201

(56) References Cited

U.S. PATENT DOCUMENTS

| | | |
|---|---|---|
| 4,598,170 | 7/1986 | Piosenka et al. . |
| 4,985,921 | 1/1991 | Schwartz . |
| 5,153,921 | 10/1992 | Kawarabayashi . |
| 5,386,469 | 1/1995 | Yearsley et al. . |

FOREIGN PATENT DOCUMENTS

| | | |
|---|---|---|
| 0 449 256 A2 | 10/1991 | (EP) . |
| 0 520 228 A2 | 12/1992 | (EP) . |
| 2 099 616 | 12/1982 | (GB) . |

OTHER PUBLICATIONS

International Application No. WO 95/16238 (Jones et al.), dated Jun. 15, 1995.
Derwent Abstract No. AN 88–089850.
Patent Abstracts of Japan No. 3–108830 A (Doi), dated May 9, 1991.
Data Book Soft Microcontroller, Oct. 6, 1993, pp. 1–3, 7, 8, 73, 77–80, 152–156, 229, 290–292.

*Primary Examiner*—Thomas R. Peeso
(74) *Attorney, Agent, or Firm*—Herbert L. Lerner; Laurence A. Greenberg; Werner H. Stemer

(57) ABSTRACT

An electronic data processing circuit includes an operating module such as a microprocessor, at least one data memory and a data bus extending between the data memory and the operating module. In order to provide an electronic data processing circuit which is better protected against undesired alterations, at least one encoding module is provided in the region between the data memory and the data bus and/or in the region between the operating module and the data bus. The encoding module is constructed in such a way that data traffic between the operating module and the data bus or between the data memory and the data bus can be encoded and/or decoded.

17 Claims, 3 Drawing Sheets

ELECTRONIC DATA PROCESSING CIRCUIT

CROSS-REFERENCE TO RELATED APPLICATION

This application is a continuation of copending International application No. PCT/DE97/02070, filed Sep. 15, 1997, which designated the United States.

BACKGROUND OF THE INVENTION

FIELD OF THE INVENTION

The invention relates to an electronic data processing circuit having an operating module such as, for example, a microprocessor, at least one data memory and a data bus extending between the data memory and the operating module.

Electronic data processing circuits of the generic type are frequently used in applications which are critical with regard to security. In such a case, confidential data, money values and access authorizations which are processed by the operating module, for example upon an external request, are stored in the data memory.

Since the memory contains information which is not to be accessed as far as possible, it is necessary to take security measures against manipulations of the electronic data processing circuit.

When an electronic data processing circuit of the generic type is constructed as an integrated circuit, it can be covered with different passivation layers. In that case, the passivation layers can be applied in such a way that removing a passivation layer entails the destruction of the data memory. Furthermore, the data memory can be buried in deeper lying layers of the integrated circuit, thus rendering access to it more difficult.

A further possibility for protecting an electronic data processing circuit against undesired manipulations is using sensors which sample operating conditions of the electronic data processing circuit. As soon as a value sampled by a sensor is outside a normal value, appropriate security measures are initiated which lead to deactivation of the electronic data processing circuit or else to an erasure of the data memory.

Furthermore, there are also software sensors which monitor the operation of the operating module for forbidden commands or for instances of access to address areas which are blocked for normal operation. Moreover, the access sequence can be monitored for its correctness.

Finally, it is further known for instances of access by the operating module to the data memory which are permitted in a special production mode to be limited by special hardware devices such as, for example, interruptably configured connecting tracks.

Despite the security measures set forth above, undesired manipulations occasionally occur on the electronic data processing circuits of the generic type.

SUMMARY OF THE INVENTION

It is accordingly an object of the invention to provide an electronic data processing circuit, which overcomes the hereinafore-mentioned disadvantages of the heretofore-known devices of this general type and which is better protected against undesired alterations.

It is accordingly an object of the invention to provide an electronic data processing circuit, comprising an operating module, such as a microprocessor; at least one data memory; a data bus having at least one data line connected between the at least one data memory and the operating module; and at least two encoding modules disposed in the vicinity of the at least one data line, the encoding modules cooperating to provide a complete encoding or decoding.

The invention is based on the finding, which is essential to the invention, that new technical methods have made it easier to precisely manipulate electronic data processing circuits that are constructed as integrated circuits. Thus, from the point of view of a manipulator, an electronic data processing circuit in an integrated circuit is no longer to be regarded in its totality only as a chip, but as a system which is formed of individual components on a silicon substrate and the components of which can be accessed separately.

It is therefore possible to draw conclusions about the information stored in the data memory by observing the data traffic on the data bus or by reading out the data memory, and that facilitates manipulation.

In accordance with a further finding, which is essential to the invention, many manipulations on the electronic data processing circuits of the generic type are to be ascribed to the fact that success has been achieved in "tapping" the data traffic on the data bus, with the result that the program flow in the operating module can be observed and understood in an undesirable manner.

In accordance with the invention, it is proposed to transport the data encoded in the electronic data processing circuit, so that devices are provided between the data bus and data memory or the operating module and data bus in order to encode and to decode the data traffic transported on the data bus. The devices of that type are denoted below as "encoding modules", and that denotation is specifically not limited to devices which execute only encoding. In accordance with the basic concept of the invention, this denotation also covers devices which execute both encoding and decoding or only one of the two operations.

The configuration of the electronic data processing circuit according to the invention ensures that even in the case of successful tracking of the data traffic on the data bus it is not possible to draw direct conclusions regarding the data stored in the data memory. Furthermore, it is not possible to directly draw conclusions on the program flow from the information obtained when tracking the data traffic on the data bus. Specifically, even where data stored in the data memory are successfully read out, it is not possible to draw direct conclusions regarding their meaning, since they make no sense to an unschooled observer.

In accordance with the invention, it is particularly advantageous in this case that encoding and decoding be performed in a manner distributed or dislocated over the entire chip, because successful manipulation would require simultaneous observation of a plurality of locations of the electronic data processing circuit, and that can only be done with difficulty from a technical point of view.

It is important in the case of electronic data processing circuits provided with a latch buffer for buffering instances of access to the data memory that the encoding module be disposed in such a way that the content of the latch buffer is always encoded. Specifically, the content of the latch can be observed relatively easily, in such a way that during operation of the data processing circuit according to the invention it must be present in an encoded manner for the sake of security.

In accordance with the invention, the encoding and decoding can extend as far as into a CPU of a data processing circuit according to the invention. However, encoding and decoding can also be performed independently of one another in a plurality of encoding modules. In accordance with the invention, however, solutions are also covered in which only a single encoding module is provided.

Finally, there is a further advantage in data processing circuits which simultaneously process different applications in multitasking processing. Then, different applications or tasks can be assigned different data memories by suitable encoding, with a different key being agreed for each task. As a result, one task cannot access data of the other task.

It may therefore be stated in summary that in accordance with the invention it is now no longer sufficient to only examine the data processing circuit physically. In addition, it is now necessary, in particular, in conjunction with observing a plurality of components, to also detect the key stored in the encoding module or in the encoding modules and, if appropriate, the activation of this key.

In accordance with another feature of the invention, the encoding module is constructed in such a way that data traffic on the data bus can be encoded through the use of an encoding algorithm. An encoding module constructed in such a way has the advantage that it can be produced in a particularly cost-effective manner by mass production. However, encoding through the use of an algorithm takes a very long time, since it requires extensive calculations in the operating module. Real-time operation of this data processing circuit according to the invention is therefore not currently possible.

In accordance with a further feature of the invention, the encoding module is constructed in such a way that data traffic on the data bus can be encoded through the use of hardware encoding. It is precisely in the case of hardware encoding that it is already very easy to realize operation of the data processing circuits according to the invention in real time, specifically both when the data memory is being accessed for reading and when it is being accessed for writing.

In accordance with an added feature of the invention, the hardware encoding can be performed through the use of an encoding module which is constructed in such a way that the significance of individual bits of the data traffic can be changed selectively. Bits which, for example, are stored in the memory as "LOW" then appear in data traffic on the data bus as "HIGH". In accordance with an additional feature of the invention, this can be performed, for example, through the use of an encoding module which has at least one EXOR element.

In accordance with yet another feature of the invention, the encoding module can be constructed in such a way that the connecting sequence of the data lines of the data bus can be changed selectively. This is seen on the outside as if individual bit lines of the data bus were interchanged.

In accordance with yet a further feature of the invention, the hardware encoding can also be executed by an encoding module which is constructed in such a way that the data traffic between the data bus and the operating module and/or between the data bus and the data memory can be delayed selectively, at least partially. As a result, data traffic is simulated on the data bus which bears no relation to the instantaneous operating state of the electronic data processing circuit according to the invention.

An essential feature of the data processing circuit according to the invention in this case is that the encoding module is constructed in such a way that the encoding operates selectively. This not only signifies that encoding can optionally be performed or not. In addition, in accordance with the invention this also covers the possibility of switching between different keys for encoding the data traffic. In this case, the use of the encoding module according to the invention assumes a dynamic behavior.

It is envisaged precisely in the case of the data processing circuit according to the invention and having changing keys that data processing circuits of a batch are respectively provided with different and individual keys. This ensures that even should the key of one data processing circuit be known it is still not possible to draw conclusions regarding the keys of other data processing circuits.

In accordance with yet an added feature of the invention, the encoding module has at least one input for inputting at least one key. However, this input into the encoding module can also be used for the purpose of switching over between specific keys stored in the encoding module itself, and even between the encoding methods applied in the encoding module. It is also possible in an entirely simple way to activate or deactivate a single encoding method.

In a departure therefrom, it is also possible to input a key stored outside the encoding module through the input. In accordance with yet an additional feature of the invention, for this purpose, the key is advantageously stored in a FLASH cell or in an EEPROM cell. The cells mentioned are regarded as relatively safe, because the information is stored on a floating gate with only "a few" electrons. Most attempts to readout their content destroy the stored information. Consequently, in accordance with this embodiment of the invention there is a particularly secure encoding of the data traffic. Furthermore, all of the FLASH cells have the advantage of being programmable. Thus, when supplying the data processing circuit according to the invention it is possible in a simple way to program individual keys into each circuit and block them for further alterations.

In accordance with again another feature of the invention, a further improvement in security results when the key is stored in a buried structure of an integrated module, and the integrated module is advantageously also accommodating the data processing circuit. Buried structures offer the advantage that they can be executed decentrally at different locations in the integrated module. This increases the security substantially, since it is very difficult for different locations in a data processing circuit accommodated in an integrated module to be observed simultaneously.

In accordance with again a further feature of the invention, there are provided sensors which sample manipulations of the location at which the key is stored, and deactivate or otherwise render useless the data processing circuit according to the invention.

In accordance with again an added feature of the invention, as an alternative to the keys stored during production of the data processing circuit according to the invention, it is also possible to provide a random number generator through the use of which a key can be selected randomly.

In accordance with again an additional feature of the invention, the selection of the key used in the encoding module is carried out by the operating module, particularly during the program flow. For this purpose, the data processing circuit in accordance with the invention is constructed in such a way that a key can be input into the encoding module during execution of predetermined operations by the operating module. Since the program code of the operating module can possibly be known, the process of selecting the key is advantageously hidden in the normal program code.

Thus, the operating module could be constructed, for example, in such a way that in the case of executing a harmless command such as, for example, Clr C ("CLEAR CARRY") the key of the encoding module or encoding modules is changed.

In accordance with still another feature of the invention, there is provided a time-measuring device which monitors a change of key and initiates such a change when the key is not changed often enough.

In accordance with still a further feature of the invention, with regard to the keys being used in the encoding modules, it is provided that the keys are generated by the operating module or the CPU. This is performed, for example, by deriving a key through the use of a conversion method from an address generated by the CPU. The advantage of this method is that the key is changed continuously, that is to say with each address.

The programmer of the operating module can influence the encoding by selecting different conversion methods. It may be stated in summary that the data traffic in the data processing circuit according to the invention can be understood by a manipulator only if the key which is respectively used in the encoding module is known. The data stored in the data memory can also be understood only with knowledge of the key belonging to the data memory. This substantially increases security against manipulations.

Of course, a programmer who is programming the operating module of the data processing circuit must keep a confidential list of which data belonging to the key he or she has stored in which addresses of the data memory or of the data processing circuit. Depending on the type of key, the programmer can also provide certain pre-conditions to be fulfilled which are expressed, for example, in such a way that it is always necessary to read pairs of values.

It is a particularly advantageous feature of the electronic data processing circuit that at least two encoding modules are provided in the region of at least one data line of the data bus which connects the operating module and at least one data memory. The encoding modules are constructed in such a way that complete encoding or decoding cannot be executed other than by the cooperation of the two encoding modules.

In accordance with a concomitant feature of the invention, the two encoding modules are disposed at different locations in the electronic data processing circuit. This embodiment ensures that encoding of the data traffic is performed at two different locations. A typical manipulator will possibly perform only one encoding at a single location, specifically in the case of a single encoding module, and nevertheless not arrive at a useful result when employing the encoding. Precisely in the case of an embodiment having two encoding modules, which are accommodated at different locations, it is specifically particularly difficult to perform an encoding, since two different locations of a microstructure can only be observed simultaneously in a particularly difficult way. The encoding modules which are thus constructed can, for example, be constructed in such a way that one encoding module encodes or decodes the lower four bits of a data bus at one location, while the other encoding module encodes or decodes the remaining bits of the data bus.

A further advantage of the method according to the invention results in the case of those data processing circuits of the generic type in which it is desired for security reasons to ensure that not all of the components of the data processing circuit can communicate with one another. It is then possible, through the use of a suitable configuration of the key, to communicate, for example with a defined number of encoding units, only in the case of the connecting paths of the data bus which are provided for that purpose. All other connections with non-suitable encodings cannot function correctly.

Other features which are considered as characteristic for the invention are set forth in the appended claims.

Although the invention is illustrated and described herein as embodied in an electronic data processing circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
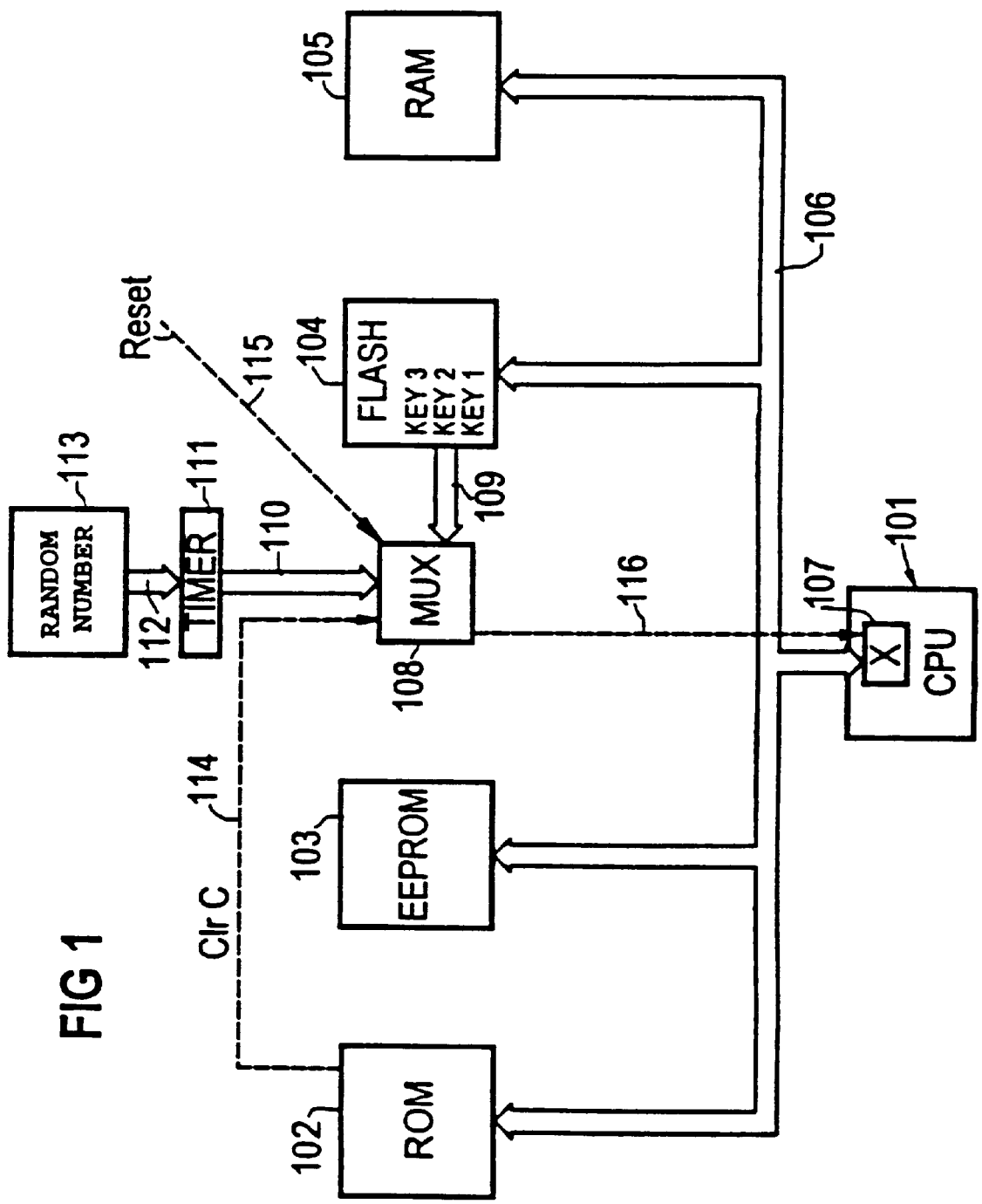
FIG. 1 is a block circuit diagram of an electronic data processing circuit according to the invention having only a single encoding device in a CPU.

Referring now to the figures of the drawings in detail and first, particularly, to FIG. 1 thereof, there is seen a data processing circuit according to the invention, which has a CPU 101 as an operating module and a plurality of data memories. In detail, these data memories are a ROM 102, an EEPROM 103, a FLASH memory 104, and a RAM 105. The data memories 102, 103, 104, 105 and the CPU 101 are connected to one another through a data bus 106.

An encoding module 107 which is provided in the CPU 101 encodes or decodes data traffic between the CPU 101 and the data memories 102, 103, 104 and 105. It may be mentioned in this case once again that such a device is referred to below as an "encoding module", although it is expressly not limited to a device which only executes encoding. In accordance with the basic concept of the invention, this designation also covers a device which executes both encoding and decoding or only one of these two operations. The encoding or decoding can be performed in this case by a suitable delay, by interchanging individual bit lines of the data bus, or by altering the significance of individual data bits. It is also possible to execute software encoding.

Furthermore, the data processing circuit according to the invention has a multiplexer 108, which is connected to the FLASH memory 104 through a data line 109. The multiplexer 108 is connected through a data line 110 to a timer 111 which can be fed a random number by a random number generator 113 through a data line 112. The multiplexer 108 also has a control line 114 through which it is connected to the ROM 102. Finally, provision is also made for a RESET line 115 to the multiplexer 108, through which the multiplexer 108 can be reset to an initial state in the event of a reset of the data processing circuit. An output of the multiplexer 108 is connected through a control line 116 to the encoding module 107, so that the encoding module 107 is supplied with a new key in response to an output signal of the multiplexer 108. According to the invention, it is also provided that the encoding method used in the encoding module 107 is switched over in the encoding module 107 in response to an output signal of the multiplexer 108 over the control line 116.

During operation, the electronic data processing circuit according to the invention behaves as follows: When the program is started (RESET), a start key is set in the multiplexer in response to a signal on the RESET line 115.

Thereupon, the data traffic between the data bus 106 and the CPU 101 is encoded or decoded in the encoding module 107. A corresponding operation is executed in accordance with the data flow direction upon each passage of data through the encoding module 107 and with each execution of a command "Clr C", the ROM 102 transmits a control pulse to the multiplexer 108 over the control line 114. Thereupon, the multiplexer 108 retrieves one of three keys KEY 3, KEY 2, KEY 1 from the FLASH memory 104 over the data line 109, and transmits it to the encoding module 107. Thereafter, either the key used in the encoding module 107 is exchanged or, depending on the significance of the signal present on the control line 116, there is a changeover from an encoding method used in the encoding module 107. If a specific operating time of the data processing circuit is exceeded without the multiplexer 108 being activated by the ROM 102, the timer 111 moves into action. The actuation of the timer 111 transmits a random number from the random number generator 113 to the multiplexer 108 over the data line 110. The multiplexer 108 then transmits the random number to the encoding module 107.

The data in the data memories 102, 103, 104 and 105 are stored in an encoded manner. Consequently, the data on the data bus 106 are transported in an encoded manner to the CPU 101, where they are decoded again by the encoding module 107. It is only thereafter that the data are ready decoded for processing in the CPU.

Figure 2:
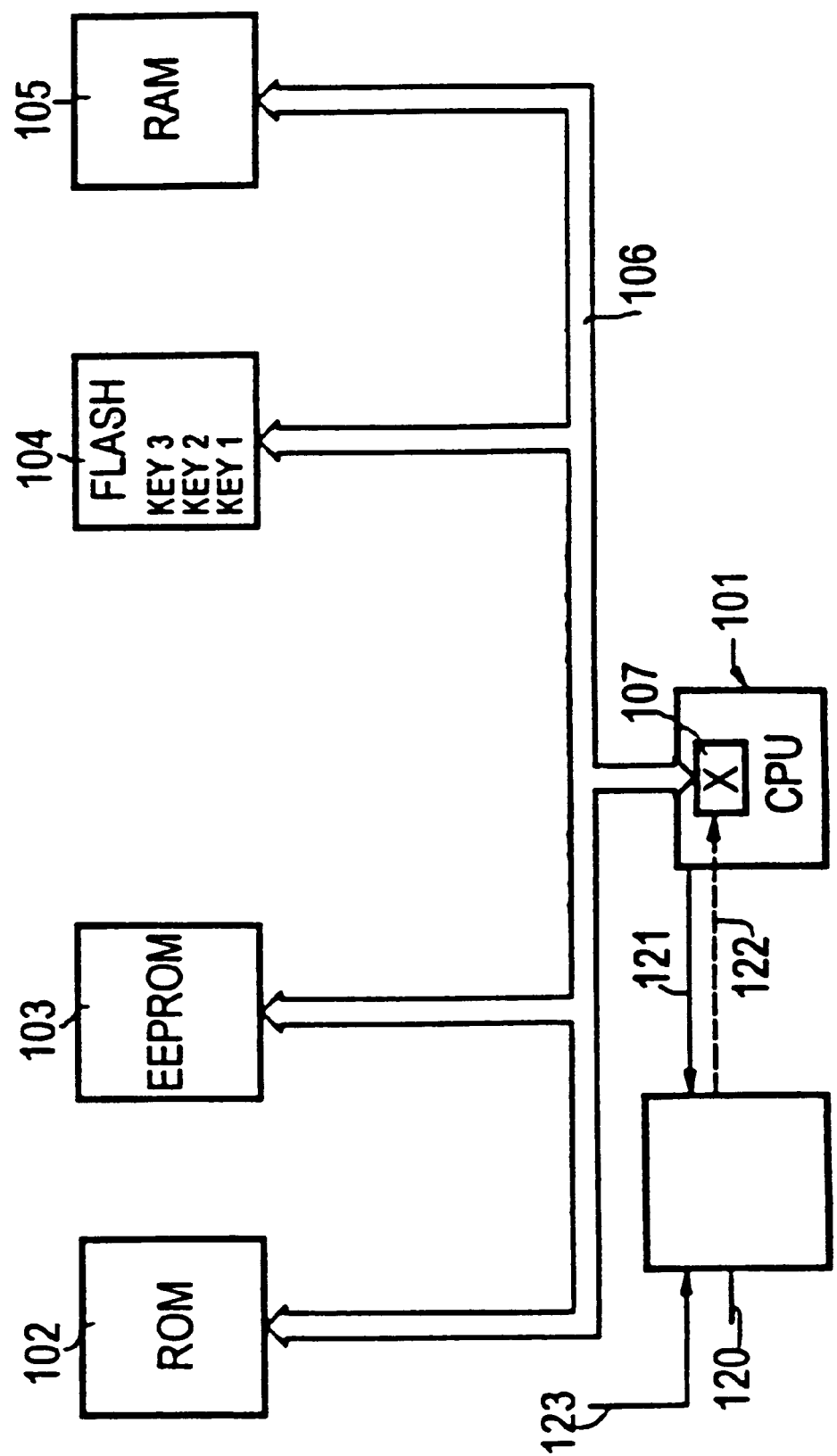
FIG. 2 is a block circuit diagram of a variant of the electronic data processing circuit of FIG. 1.

FIG. 2 shows a variant of the data processing circuit of FIG. 1, which likewise has a CPU 101 as an operating module as well as a plurality of data memories. In detail, these data memories are a ROM 102, an EEPROM 103, a FLASH memory 104 and a RAM 105. The data memories 102, 103, 104, 105 and the CPU 101 are connected to one another through a data bus 106.

An encoding module 107 which is provided in the CPU 101 encodes or decodes data traffic between the CPU 101 and the data memories 102, 103, 104 and 105.

In contrast with the embodiment of FIG. 1, the data processing circuit in FIG. 2 has no multiplexer for supplying the encoding module 107 with a new key. Instead, the data processing circuit of FIG. 2 is connected through a control line 122 to a conversion module 120, which is in turn connected to an address bus 121 of the CPU 101. Leading to the conversion module 120 is a further control line 123 through the use of which a specific conversion can be selected from a selection of different conversions from "address" to "key", that are stored in the conversion module 120. A key is thereby derived from an address present in the CPU 101 by the conversion module 120.

During operation, the electronic data processing circuit of FIG. 2 behaves essentially like that in FIG. 1. When the program is started (RESET), a start key is set in the encoding module 107 in response to a signal on the control line 123.

Thereafter, each instance of data traffic between the data bus 106 and the CPU 101 is encoded or decoded in the encoding module 107. A corresponding operation is executed in accordance with the data flow direction upon each passage of data through the encoding module 107. With each activation of the control line 123, the conversion module 120 derives a key from an address present in the CPU 101 on the basis of a new conversion.

The data in the data memories 102, 103, 104 and 105 are always stored in an encoded manner. Consequently, the data on the data bus 106 are transported in an encoded manner to the CPU 101, where they are decoded again by the encoding module 107. It is only thereafter that the data are ready decoded for processing in the CPU.

Figure 3:
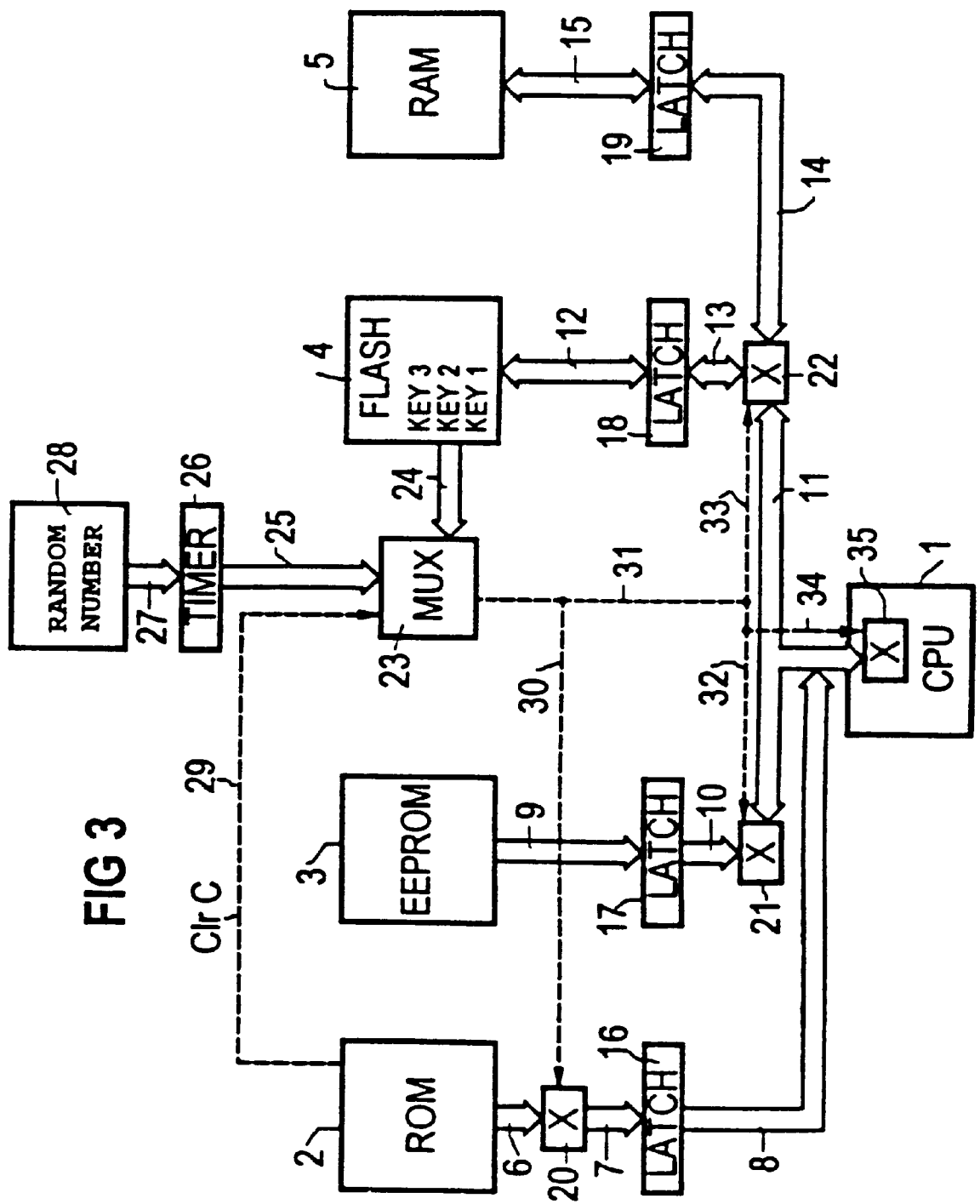
FIG. 3 is a block circuit diagram of a further electronic data processing circuit according to the invention, having encoding devices in the CPU and in a region of data memories.

The data processing circuit according to the invention which is shown in FIG. 3 has a CPU 1 as an operating module and a plurality of data memories. In detail, these data memories are a ROM 2, an EEPROM 3, a FLASH memory 4 and a RAM 5. The data memories 2, 3, 4, 5 and the CPU 1 are connected to one another through a data bus (which is not shown in this view). Instead of the data bus, the CPU 1 exchanges data with the data memories 2, 3, 4, 5 through individual data lines 6, 7, 8, 9, 10, 11, 12, 13, 14 and 15 which are provided in this embodiment. A latch buffer 16, 17, 18, 19 is furthermore disposed between the CPU 1 and each of the ROM 2, the EEPROM 3, the FLASH 4 and the RAM 5, respectively.

Encoding modules 20, 21, 22 and 35, which encode or decode the data traffic on the data lines assigned to them, are provided in the region between the ROM 2 and the latch 16, in the region between the latch 17 and the CPU 1, in the region between the latches 18, 19 and the CPU 1 as well as in the CPU 1 itself. It may be mentioned in this case once again that the devices of this type are referred to below as "encoding modules", although they are expressly not limited to devices which only execute encoding. In accordance with the basic concept of the invention, this designation also covers devices which execute both encoding and decoding or only one of these two operations. The encoding or decoding can be performed in this case by a suitable delay, by interchanging individual bit lines of the data lines, or by altering the significance of individual data bits. It is also possible to execute software encoding.

The encoding modules 20, 21, 22 and 35 are constructed in such a way that the data traffic on the data lines assigned to them is respectively encoded or decoded only partially. A complete encoding or decoding results only upon cooperation of a respective one of the encoding modules 20, 21, 22 with the encoding module 35.

Furthermore, the data processing circuit according to the invention has a multiplexer 23, which is connected to the FLASH memory 4 through a data line 24. The multiplexer 23 is connected through a data line 25 to a timer 26, which can be fed a random number by a random number generator 28 over a data line 27. The multiplexer 23 also has a control line 29, through which it is connected to the ROM 2.

An output of the multiplexer 23 is connected through control lines 30, 31, 32, 33, 34 to the encoding modules 20, 21, 22, 35. The encoding modules 20, 21, 22, 35 are supplied with a new key in response to an output signal of the multiplexer 23.

During operation, the electronic data processing circuit according to the invention behaves as follows: With each execution of a command "Clr C", the ROM 2 transmits a control pulse to the multiplexer 23 over the control line 29. Thereupon, the multiplexer 23 retrieves one of three keys KEY 3, KEY 2, KEY 1 from the FLASH memory 4 over the data line 24, and transmits it to the encoding modules 20, 21, 22 and 35. If a predetermined operating time of the data processing circuit is exceeded without the multiplexer 23 being activated by the ROM 2, the timer 26 moves into action. The actuation of the timer 26 transmits a random number from the random number generator 28 to the multiplexer 23 over the data line 25. The multiplexer 23 then transmits the random number to the encoding modules 20, 21, 22, 35.

The data in the ROM 2 are stored in an encoded manner, and they are only partially decoded by the encoding device 20 during readout in the latch 16. Consequently, the data from the ROM 2 are transported on a data line 8 while still partially encoded as far as the CPU 1, where they are completely decoded by the encoding module 35. It is only thereafter that the data are ready decoded for processing in the CPU 1.

The data which are provided in an encoded manner in the EEPROM 3 are transmitted encoded over a data line 9 to the latch 17, and relayed from there to the encoding module 21, where they are partially decoded. From there, the still partially encoded data pass through a data line 11 to the CPU 1, where they are completely decoded by the encoding module 35 and are thereafter available for processing.

Data for the FLASH memory 4 and for the RAM 5 are initially respectively encoded partially by the encoding module 35 and the encoding module 22, before they are stored completely encoded in the FLASH memory 4 or in the RAM 5. For this purpose, the data which are partially encoded in the encoding module 35 of the CPU 1 are transmitted over the data line 11 to the encoding module 22, where they are completely encoded before they are handed over through respective data lines 13 and 14 to the latches 18, 19 respectively assigned to the FLASH memory 4 and the RAM 5. The encoded data pass from the latches 18, 19 to the respective FLASH memory 4 or RAM 5 over data lines 12, 15.

When the data are read out of the FLASH memory 4 and of the RAM 5, they are initially respectively decoded partially by the encoding module 22 and by the encoding module 35 before they are available for processing completely decoded in the CPU 1.

I claim:

1. An electronic data processing circuit, comprising:
   an operating module;
   at least one data memory;
   a data bus having at least one data line connected between said at least one data memory and said operating module; and
   at least two encoding modules disposed in the vicinity of said at least one data line, said encoding modules cooperating to provide a complete encoding or decoding.

2. The electronic data processing circuit according to claim 1, including different locations at which said encoding modules are disposed.

3. The electronic data processing circuit according to claim 1, wherein said encoding modules encode data traffic with an encoding algorithm.

4. The electronic data processing circuit according to claim 1, wherein said encoding modules encode data traffic by hardware encoding.

5. The electronic data processing circuit according to claim 1, wherein said encoding modules selectively change the significance of individual bits of data traffic.

6. The electronic data processing circuit according to claim 5, wherein said encoding modules have at least one EXOR element.

7. The electronic data processing circuit according to claim 1, wherein said encoding modules selectively change a connecting sequence of said at least one data line.

8. The electronic data processing circuit according to claim 1, wherein said encoding modules at least partially selectively delay data traffic.

9. The electronic data processing circuit according to claim 1, wherein said encoding modules have at least one input for inputting at least one key.

10. The electronic data processing circuit according to claim 9, including a flash cell for storing said at least one key.

11. The electronic data processing circuit according to claim 9, including an integrated module for accommodating the data processing circuit, said integrated module having a buried structure for storing said at least one key.

12. The electronic data processing circuit according to claim 9, including a sensor for sampling manipulations of a location at which said at least one key is stored.

13. The electronic data processing circuit according to claim 9, wherein said at least one key can be input into said encoding modules during execution of predetermined operations by said operating module.

14. The electronic data processing circuit according to claim 9, including a random number generator for randomly selecting said at least one key.

15. The electronic data processing circuit according to claim 9, including a device for deriving said at least one key from an address used in said operating module.

16. The electronic data processing circuit according to claim 9, including a time-measuring device for initiating a change of said at least one key.

17. The electronic data processing circuit according to claim 1, wherein said operating module is a microprocessor.

* * * * *